United States Patent [19]

Hansen et al.

[11] Patent Number: 5,380,600
[45] Date of Patent: Jan. 10, 1995

[54] FUEL CELL SYSTEM

[75] Inventors: Tommy Hansen, Tikob; Ernst Jorn, Lyngby, both of Denmark

[73] Assignee: Haldor Topsoe A/S, Lyngby, Denmark

[21] Appl. No.: 101,990

[22] Filed: Aug. 4, 1993

Related U.S. Application Data

[63] Continuation of Ser. No. 863,766, Apr. 6, 1992, abandoned, which is a continuation of Ser. No. 540,181, Jun. 19, 1990, abandoned.

[30] Foreign Application Priority Data

Jun. 19, 1989 [DK] Denmark .................. 3010/89

[51] Int. Cl.$^6$ .............................................. H01M 8/06
[52] U.S. Cl. ................................. 429/17; 429/19
[58] Field of Search ................................ 429/17, 19

[56] References Cited

U.S. PATENT DOCUMENTS

| | | |
|---|---|---|
| 3,266,938 | 8/1966 | Parker et al. |
| 4,182,795 | 1/1980 | Baker et al. ............... 429/26 |
| 4,532,192 | 7/1985 | Baker et al. ............... 429/19 |
| 4,647,516 | 3/1987 | Matsumura et al. ........ 429/19 |
| 4,877,693 | 10/1989 | Baker ........................ 429/19 |
| 4,933,242 | 6/1990 | Koga et al. ................. 429/19 |

Primary Examiner—Stephen Kalafut
Assistant Examiner—M. Nuzzolillo
Attorney, Agent, or Firm—Ostrolenk, Faber, Gerb & Soffen

[57] ABSTRACT

The invention relates to a process for the production of electricity in a fuel cell system by steam reforming a carbonaceous fuel to form fuel cell reactant gas and recycling recovered reactants from the anode exhaust gas to the anode inlet. There is obtained an increase of the electricity production of 20–30% if prior to the recovery and recycling the anode exhaust gas is passed over a steam reforming catalyst by which lower hydrocarbons in said exhaust gas is converted to reactants for use in the fuel. The carbonaceous fuel may for instance be natural gas or methane. A fuel cell system for use in the process comprises supply means (2,10) for carbonaceous fuel; an inlet reformer unit (6) for producing reactant gas for the fuel cell (4); an outlet reforming unit (12) for converting hydrocarbon-containing anode exhaust gas to anode reactant gas; and means (18,90) for recovering the reactant gas and recycling recovered anode reactant gas.

3 Claims, 1 Drawing Sheet

FUEL CELL SYSTEM

This is a continuation of application Ser. No. 07/863,766, now abandoned filed Apr. 6, 1992, which was a continuation of application Ser. No. 07/540,181, filed Jun. 19, 1990, now abandoned.

FIELD OF THE INVENTION

The present invention relates to a fuel cell system and, in particular, to a fuel cell system employing carbonaceous fuel, which is converted to fuel cell reactant gas by steam reforming.

BACKGROUND OF THE INVENTION

In a fuel cell, reactant gas generates by galvanical reactions electricity with high efficiency. The reactant gas, such as hydrogen and carbon monoxide, entering the anode of the cell is usually derived from hydrocarboneous sources like an alcohol or fossil fuel by steam reforming processes. The fuel has to be converted to reactant gas over a reforming catalyst in the anode compartment of the fuel cell prior to contacting the reactant gas with the anode. Waste heat from the exothermic electrochemical reactions in the fuel cell is thereby used to the endothermic reforming reactions.

In conventionally designed fuel cell systems comprising e.g. an internal reforming fuel cell, which operates at high temperatures, the incoming gas is equilibrated in the internal inlet reforming unit at a temperature and pressure close to the operating conditions of the cell, usually at 600°–700° C. and a pressure slightly higher than atmospheric, depending on the mechanical conditions of the cell. Hydrocarbons are thereby converted to the anode reactant gas by the following reactions:

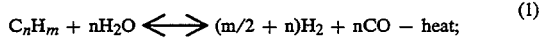

$$C_nH_m + nH_2O \rightleftharpoons (m/2 + n)H_2 + nCO - heat; \quad (1)$$

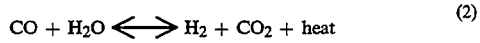

$$CO + H_2O \rightleftharpoons H_2 + CO_2 + heat \quad (2)$$

In the anode chamber of a molten carbonate fuel cell, about 75% of the anode reactant gas containing hydrogen, carbon oxides and unconverted lower hydrocarbons is electrochemically reacted with an oxidant; thereby one mole water and one mole carbon dioxide is added to the anode exhaust gas for each mole hydrogen converted in the cell, due to electron transport from the cathode to the anode by means of the $CO_3^{2-}$ ions.

This results in an anode exhaust gas containing unconverted hydrogen, carbon monoxide, carbon dioxide and lower hydrocarbons which are present in the anode fuel reactant gas. At about 650° C., which is the working temperature of the molten carbonate fuel cell, the anode material, usually nickel, has catalytic activity to the shift reaction (2), and a strongly reduced activity to the reforming reaction (1). A reforming catalyst arranged in direct contant with the gas surrounding the anode will be poisoned by the electrolyte of the fuel cell. Thus, the content of lower hydrocarbons in the equilibrated anode reactant gas is not available to the electrochemical process.

Unconverted hydrogen in the exhaust gas of the anode chamber is usually recovered and recycled to the anode. This is advantageously obtained in a phosphoric acid electrochemical cell as mentioned in U.S. Pat. No. 4,532,192 or by the known absorption and diffusion methods, such as molecular sieves absorption or palladium membrane diffusion (cfr "Ullmanns Encyklopädie der technischen Chemie", 3rd edition, Vol. 18, pp. 521–522 and 527–528). By the known methods about 90% of hydrogen is recovered. However, lower hydrocarbons are not recovered by these methods and thus lost with respect to electricity generation.

BRIEF DESCRIPTION OF THE INVENTION

It is therefore an object of the present invention to improve the efficiency and performance of a fuel cell system using reformer gas as anode reactant gas by increasing the utilization of carbonaceous fuel.

Accordingly, the invention provides an improved method of producing electricity in a fuel cell system comprising a reformer gas employing fuel cell with an anode and a cathode compartment by reforming carbonaceous fuel to fuel cell reactant gas, contacting the reactant gas with the fuel cell and recycling recovered and purified reactants in anode exhaust gas to the anode of the fuel cell, the improvement of which comprises the step of passing the anode exhaust gas of the fuel cell over a reforming catalyst prior to recovery, purification and recycling, thereby converting lower hydrocarbons in the anode exhaust gas to reactants for the anode of the fuel cell.

It is further an object of the present invention to provide a fuel cell system for use in the improved method, wherein the utilization of carbonaceous fuel is increased.

BRIEF DESCRIPTION OF THE DRAWINGS

The above objects and further embodiments of the present invention will become more apparent by the following detailed description and drawing, in which.

The figures are simplified and individual units and parts, such as heat exchanger, pumps and utility installations or connections, which are conventional, are not included. Neither are shown installations pertaining to the cathode circuit, which are to be understood as conventional parts, not concerning with the present invention.

DETAILED DESCRIPTION OF THE INVENTION

Figure 1:
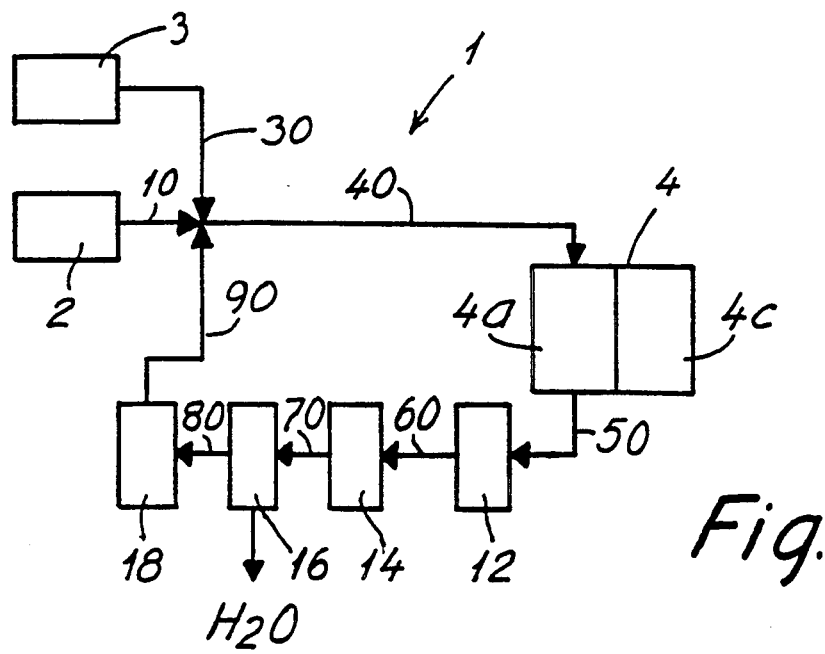
FIG. 1 shows in purely schematic form a fuel cell system according to an embodiment of the invention.

FIG. 1 shows in simplified form a fuel cell system 1 using the principle of indirect and intermediate conversion of carbonaceous fuel to anode reactant gas by steam reforming in an internal inlet reforming unit.

A stream of fuel is supplied by fuel supply 2 to the anode compartment 4a of fuel cell 4 via supply line 10 and 40. Necessary steam for the reforming reaction (1) is added to line 10 from steam supply 3 via line 30.

The cell 4 comprises internal inlet reforming unit 6 (FIGS. 2 & 3), and a stack of molten carbonate fuel cells forming anode chamber 4b and cathode chamber 4c. The inlet reformer unit 6 is arranged in direct heat contact with the fuel cell 4 by heat conducting separator plate 5.

Fuel reaching the internal inlet reforming unit 6 is converted to anode reactant gas by an internal reforming process and then sent through line 45 to anode chamber 4b.

Figure 2:
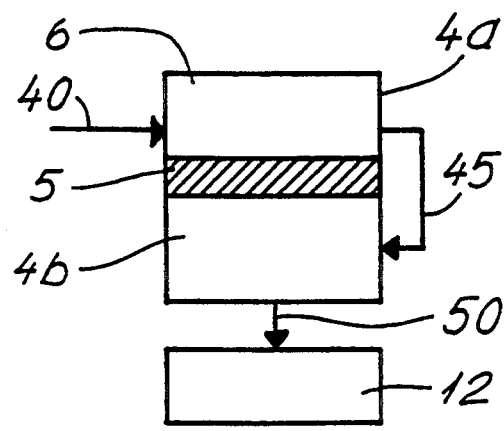
FIG. 2 is an enlarged schematic view of the anode compartment of a fuel cell employing an anode outlet reformer unit connected in series for use in the fuel cell system according to an embodiment of the invention.
Figure 3:
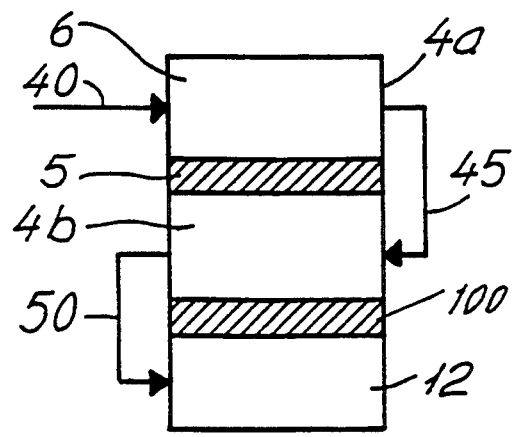
FIG. 3 shows substantially the same as FIG. 2 except that the outlet reformer unit is arranged in heat contact to the fuel cell pursuant to a preferred embodiment of the invention.

The anode exhaust gas leaving the anode compartment 4a is passed to outlet reformer unit 12 (FIGS. 2 & 3) via line 50. According to an embodiment of the invention, the outlet reformer unit 12 works under adiabatic conditions as shown in FIG. 2. In a preferred embodiment of the invention, the outlet reformer unit 12 is arranged in heat conducting relationship to the fuel cell 4. This is obtained by heat conducting separator plate 100 as shown in FIG. 3, or by other convenient methods, such as heat exchange with hot gases leaving the cathode compartment of the fuel cell.

The outlet reformer unit 12 may be a catalyst hardware chamber, such as a monolith structured reforming catalyst, or a reactor vessel, such as a wiremesh chamber containing particles of the reforming catalyst in any convenient shape.

In the outlet reformer unit 12, unconverted lower hydrocarbons contained in the anode exhaust gas are reformed to anode reactant gas according to reaction (1).

The reformed anode exhaust gas is then passed from the reformer unit 12 via line 60 to shift unit 14, wherein CO contained in the reformed gas is converted to $CO_2$ and additional $H_2$ according to reaction (2).

The gas thus converted is cooled and water is separated in condenser 16, which is connected to the shift unit 14 by line 70, before the gas enters through line 80 hydrogen recovery unit 18. $H_2$-recovery may be obtained by any of the known methods as mentioned hereinbefore.

Recovered hydrogen is then recycled to the anode supply line 40 via line 90.

In the following computation model shown in Examples 1 and 2, the performance of the improved fuel cell system according to the invention will be compared with a fuel cell system without the outlet reformer unit 12. In all cases methane is assumed as carbonaceous fuel, which is fed in a constant amount of 100 normal cubic meter per hour (NCU.M/H) to the anode compartment comprising internal inlet reformer 6 and a stack of 2500 molten carbonate fuel cells.

For the purpose of comparison the following process parameters are assumed to be the same in all cases:

75% of the amount of reactant gas fed to the anode chamber via line 45 (FIGS. 2 & 3) is converted in the anode chamber to water and carbon dioxide, no conversion of methane contained in the reactant gas takes place;

45% of the reactant gas are used in production of electricity;

the anode compartment is kept at a constant temperature of 650° C.; and hydrogen recovery in the recovery unit 18 is 90%.

EXAMPLE 1

The performance of a fuel cell system provided with the outlet reformer unit 12 in adiabatic mode according to one embodiment of the invention is compared with a corresponding system without the outlet reformer unit.

The operation conditions and stream compositions in different lines and units of the systems are summarized below in Table 1 and Table 2 for the fuel cell system with the outlet reformer unit 12 in adiabatic mode and the corresponding system without the outlet reformer unit, respectively.

Under the shown conditions the fuel cell system provided with the outlet reformer unit 12 in adiabatic mode (FIG. 2) would increase the output of electricity from the fuel cell from 501 kW, as calculated for the fuel cell system without outlet reformer unit 12, to 591 kW, obtained in the improved system.

EXAMPLE 2

By arranging the outlet reformer unit 12 in heat contact with the fuel cell 4 (FIG. 3), the output of electricity would even be increased to 657 kW as shown below in Table 3.

TABLE 1

| | Adiabatic Outlet Reforming El Production: 591 kW | | | | | | | | |
|---|---|---|---|---|---|---|---|---|---|
| Line | 10 | 30 | 40 | 45 | 50 | 60 | 70 | 80 | 90 |
| Temperature, °C. | 25.00 | 200.00 | 600.00 | 650.00 | 650.00 | 549.63 | 247.05 | 40.00 | 78.50 |
| Pressure, kg/cm$^2$, CMG | 0.540 | 1.000 | 0.170 | 0.170 | 0.165 | 0.165 | 0.125 | 0.110 | 0.200 |
| Mole weight, K/kmol | 16.04 | 18.02 | 11.07 | 8.81 | 25.90 | 24.79 | 24.79 | 27.74 | 2.02 |
| Total flow, Nm$^3$/h | 100 | 200 | 509 | 639 | 959 | 1002 | 1002 | 697 | 208 |
| | | | | Composition, mole % | | | | | |
| Hydrogen | 0.0000 | 0.0000 | 40.9851 | 66.7572 | 11.1212 | 18.6676 | 23.1144 | 33.2113 | 100.0000 |
| Water | 0.0000 | 100.0000 | 39.3536 | 17.5952 | 45.0883 | 39.4215 | 34.9747 | 6.5805 | 0.0000 |
| Carbon monoxide | 0.0000 | 0.0000 | 0.0000 | 6.6893 | 4.4191 | 4.7903 | 0.3434 | 0.4935 | 0.0000 |
| Carbon dioxide | 0.0000 | 0.0000 | 0.0000 | 3.5177 | 35.7460 | 35.7970 | 40.2438 | 57.8128 | 0.0000 |
| Methane | 100.0000 | 0.0000 | 19.6613 | 5.4406 | 3.6254 | 1.3237 | 1.3237 | 1.9019 | 0.0000 |
| | | | | Component flows, Nm$^3$/h | | | | | |
| Hydrogen | 0 | 0 | 208 | 427 | 107 | 187 | 232 | 232 | 208 |
| Water | 0 | 200 | 200 | 112 | 432 | 395 | 350 | 46 | 0 |
| Carbon monoxide | 0 | 0 | 0 | 43 | 42 | 48 | 3 | 3 | 0 |
| Carbon dioxide | 0 | 0 | 0 | 22 | 343 | 359 | 403 | 403 | 0 |
| Methane | 100 | 0 | 100 | 35 | 35 | 13 | 13 | 13 | 0 | with a fuel cell system without the outlet reformer unit

TABLE 2

| | No Outlet Reforming El Production: 501 kW | | | | | | | | |
|---|---|---|---|---|---|---|---|---|---|
| Line | 10 | 30 | 40 | 45 | 50 | 60 | 70 | 80 | 90 |
| Temperature, °C. | 25.00 | 200.00 | 600.00 | 650.00 | 650.00 | 650.00 | 243.47 | 40.00 | 78.50 |
| Pressure, kg/cm$^2$, CMG | 0.540 | 1.000 | 0.170 | 0.170 | 0.165 | 0.165 | 0.125 | 0.110 | 0.200 |
| Mole weight, K/kmol | 16.04 | 18.02 | 13.27 | 9.85 | 26.16 | 26.16 | 26.16 | 30.83 | 2.02 |
| Total flow, Nm$^3$/h | 100 | 200 | 409 | 551 | 812 | 812 | 812 | 516 | 109 |

TABLE 2-continued

| | No Outlet Reforming El Production: 501 kW | | | | | | | | |
|---|---|---|---|---|---|---|---|---|---|
| Line | 10 | 30 | 40 | 45 | 50 | 60 | 70 | 80 | 90 |
| Composition, mole % | | | | | | | | | |
| Hydrogen | 0.0000 | 0.0000 | 26.6441 | 63.1889 | 10.7179 | 10.7179 | 14.9128 | 23.4665 | 100.0000 |
| Water | 0.0000 | 100.0000 | 48.9167 | 18.6661 | 44.8178 | 44.8178 | 40.6229 | 6.5804 | 0.0000 |
| Carbon monoxide | 0.0000 | 0.0000 | 0.0000 | 8.1020 | 4.3765 | 4.3765 | 0.1816 | 0.2857 | 0.0000 |
| Carbon dioxide | 0.0000 | 0.0000 | 0.0000 | 4.7752 | 36.5138 | 36.5138 | 40.7087 | 64.0434 | 0.0000 |
| Methane | 100.0000 | 0.0000 | 24.4392 | 5.2678 | 3.5740 | 3.5740 | 3.5740 | 5.6240 | 0.0000 |
| Component flows, $Nm^3/h$ | | | | | | | | | |
| Hydrogen | 0 | 0 | 109 | 348 | 87 | 87 | 121 | 121 | 109 |
| Water | 0 | 200 | 200 | 103 | 364 | 364 | 330 | 34 | 0 |
| Carbon monoxide | 0 | 0 | 0 | 45 | 36 | 36 | 1 | 1 | 0 |
| Carbon dioxide | 0 | 0 | 0 | 26 | 297 | 297 | 331 | 331 | 0 |
| Methane | 100 | 0 | 100 | 29 | 29 | 29 | 29 | 29 | 0 |

TABLE 3

| | Isothermal Outlet Reforming El Production: 657 kW | | | | | | | | |
|---|---|---|---|---|---|---|---|---|---|
| Line | 10 | 30 | 40 | 45 | 50 | 60 | 70 | 80 | 90 |
| Temperature, °C. | 25.00 | 200.0 | 600.00 | 650.00 | 650.00 | 650.00 | 278.92 | 40.00 | 78.50 |
| Pressure, $kg/cm^2$, CMG | 0.540 | 1.000 | 0.170 | 0.170 | 0.165 | 0.165 | 0.125 | 0.110 | 0.200 |
| Mole weight, K/kmol | 16.04 | 18.02 | 9.95 | 8.21 | 25.77 | 24.07 | 24.07 | 26.35 | 2.02 |
| Total flow, $Nm^3/h$ | 100 | 200 | 580 | 703 | 1066 | 1142 | 1142 | 829 | 280 |
| Composition, mole % | | | | | | | | | |
| Hydrogen | 0.0000 | 0.0000 | 48.2646 | 68.9148 | 11.3581 | 19.8377 | 27.2491 | 37.5310 | 100.0000 |
| Water | 0.0000 | 100.0000 | 34.4993 | 16.8620 | 45.1907 | 39.5788 | 32.1674 | 6.5806 | 0.0000 |
| Carbon monoxide | 0.0000 | 0.0000 | 0.0000 | 5.8729 | 4.4568 | 8.1329 | 0.7215 | 0.9938 | 0.0000 |
| Carbon dioxide | 0.0000 | 0.0000 | 0.0000 | 2.8670 | 35.3794 | 32.3741 | 39.7855 | 54.7892 | 0.0000 |
| Methane | 100.0000 | 0.0000 | 17.2361 | 5.4834 | 3.6149 | 0.0765 | 0.0765 | 0.1054 | 0.0000 |
| Component flows, $Nm^3/h$ | | | | | | | | | |
| Hydrogen | 0 | 0 | 280 | 485 | 121 | 227 | 311 | 311 | 280 |
| Water | 0 | 200 | 200 | 119 | 482 | 452 | 367 | 55 | 0 |
| Carbon monoxide | 0 | 0 | 0 | 41 | 48 | 93 | 8 | 8 | 0 |
| Carbon dioxide | 0 | 0 | 0 | 20 | 377 | 370 | 454 | 454 | 0 |
| Methane | 100 | 0 | 100 | 39 | 39 | 1 | 1 | 1 | 0 |

We claim:

1. A method of generating electricity in a molten carbonate fuel cell system comprising introducing a carbonaceous fuel into the anode compartment of a fuel cell, steam reforming said carbonaceous fuel by contacting said fuel with a reforming catalyst located in said anode compartment to produce a reactant gas, contacting the reactant gas with the anode, withdrawing anode exhaust gas from the anode compartment, reforming the said anode exhaust gas by contacting it under adiabatic conditions with a reforming catalyst located outside of said anode compartment to form a second reactant gas and conveying said second reactant gas to said anode compartment, thereby compensating for the poisoning effect of electrolyte in the anode compartment upon the reforming catalyst in that compartment.

2. The method of claim 1, in which the carbonaceous fuel is natural gas.

3. The method of claim 1, in which the carbonaceous fuel comprises methane.

* * * * *